United States Patent
Fujino et al.

(10) Patent No.: US 9,684,202 B2
(45) Date of Patent: Jun. 20, 2017

(54) LIQUID CRYSTAL DISPLAY DEVICE

(71) Applicant: MITSUBISHI ELECTRIC CORPORATION, Tokyo (JP)

(72) Inventors: Toshiaki Fujino, Tokyo (JP); Yasunori Niwano, Tokyo (JP); Tetsuya Satake, Tokyo (JP); Syuichi Kira, Tokyo (JP); Hiroshi Umeda, Tokyo (JP); Hironori Matsueda, Koshi (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 178 days.

(21) Appl. No.: 14/501,822

(22) Filed: Sep. 30, 2014

(65) Prior Publication Data
US 2015/0098034 A1  Apr. 9, 2015

(30) Foreign Application Priority Data

Oct. 4, 2013 (JP) ................. 2013-208762

(51) Int. Cl.
*G02F 1/1335* (2006.01)
*G02F 1/1343* (2006.01)
(52) U.S. Cl.
CPC .. *G02F 1/133528* (2013.01); *G02F 1/134363* (2013.01); *G02F 2001/133531* (2013.01)
(58) Field of Classification Search
CPC .............................................. G02F 1/134363
See application file for complete search history.

(56) References Cited

U.S. PATENT DOCUMENTS

2010/0207862 A1* 8/2010 Xu ................... G02F 1/134336
345/90
2011/0298833 A1* 12/2011 Dorjgotov ......... G02F 1/133784
345/690

FOREIGN PATENT DOCUMENTS

JP  2003-107452 A  4/2003
JP  2013-534641 A  9/2013

* cited by examiner

*Primary Examiner* — Phu Vu
(74) *Attorney, Agent, or Firm* — Studebaker & Brackett PC

(57) ABSTRACT

A liquid crystal display device of a horizontal electric field type includes: a first electrode and a second electrode formed on a liquid-crystal-side surface of the first transparent substrate, and two polarization plates respectively adhered such that respective transmission axes thereof are orthogonal to each other, wherein the liquid crystal material is rotated by an electric field generated between the first electrode and the second electrode. With respect to the transmission axis located in an extending direction between the first electrode and the second electrode, an initial orientation direction of the liquid crystal material is within a range between a direction rotated by 0.5-degree in an opposite response direction of the liquid crystal material and a direction orthogonal to an electric field direction generated between the first electrode and the second electrode.

2 Claims, 8 Drawing Sheets

LIQUID CRYSTAL DISPLAY DEVICE

CROSS-REFERENCE TO RELATED APPLICATION

This application claims priority from Japanese Patent Application No. 2013-208762 filed on Oct. 4, 2013, the entire subject matter of which is incorporated herein by reference.

TECHNICAL FIELD

This disclosure relates to a liquid crystal display device, and more specifically, to a liquid crystal display device of a horizontal electric field type.

BACKGROUND

In general, a liquid crystal display device has a structure where a liquid crystal material is sandwiched between two transparent electrode substrates, and the liquid crystal material is oriented in a direction different by 90-degree on the respective transparent electrode substrates. When a voltage is applied between the transparent electrode substrates, the liquid crystal orientation is changed to make a display. This liquid crystal display mode is referred to as a twisted nematic mode and is used in a very wide field because a structure of the liquid crystal display device is simple and a relatively favorable display characteristic is obtained.

In recent years, many fields requires a very wide viewing angle characteristic, which cannot be accomplished in the liquid crystal display device of the twisted nematic mode. For the liquid crystal display device, a liquid crystal display device of a horizontal electric field type referred to as an in-plane switching mode or fringe field switching is applied.

In the twisted nematic mode of the background art, the liquid crystal material is enabled to respond by the voltage applied between the two transparent electrode substrate and substantially perpendicular to the electrode substrate surfaces. In contrast, in the above horizontal electric field type, the liquid crystal material is enabled to respond by an electric field generated between a pair of electrodes formed on one electrode substrate and substantially parallel with the substrate surfaces. Since the liquid crystal material does not rise relative to an observer and only the orientation direction thereof is changed in the substrate surfaces, it is possible to accomplish a very wide viewing angle characteristic.

A driving principle of the liquid crystal display device of a horizontal electric field type is briefly described. The liquid crystal material is sandwiched between the two transparent substrates and is then oriented to be parallel with the substrate surfaces. A pair of electrodes is formed on the same transparent substrate and generates an electric field substantially parallel with the substrate surfaces. An orientation of the liquid crystal material at a state where no voltage is applied is referred to as an initial orientation, and a liquid crystal orientation direction at that time is referred to as an initial orientation direction. Regarding polarization plates adhered to a front side and a back side of the liquid crystal display device, one polarization plate is adhered so that a transmission axis thereof coincides with the initial orientation direction of the liquid crystal material, and the other polarization plate is adhered so that a transmission axis thereof is orthogonal to (a direction orthogonal to the transmission axis of the one polarization plate) the initial orientation direction of the liquid crystal material.

In the liquid crystal display device manufactured in this way, the light illuminated from the back side penetrates the polarization plate on the back side and is incident on the liquid crystal material with maintaining a straight polarization state. Here, it is assumed that the liquid crystal material is oriented in the initial orientation direction because a voltage is not applied thereto, and is orthogonal to the transmission axis direction of the polarization plate on the back side. At this time, the incident light penetrates the liquid crystal material without being influenced by the liquid crystal material and reaches the polarization plate on the front side. Since the polarization plate on the front side is orthogonal to the polarization direction of the traveling light, the light cannot penetrate the same. That is, at the initial orientation state where a voltage is not applied between the two electrodes, the liquid crystal display device makes a black display.

When a voltage is applied between the two electrodes of the liquid crystal display device and a horizontal electric field substantially parallel with the transparent substrate surfaces is thus generated, the liquid crystal material changes the orientation thereof from the initial orientation direction towards the electric field direction. At this state, the light incident from the back side of the liquid crystal display device penetrates the polarization plate and reaches the liquid crystal material and the polarization state thereof is changed during the penetration through the liquid crystal material of which the liquid crystal orientation direction is changed due to the horizontal electric field. Therefore, the light can penetrate the polarization plate on the front side. That is, when the voltage is applied between the two electrodes, the liquid crystal display device makes a white display.

As described above, in the liquid crystal display device of a horizontal electric field type, the adhesion direction of the polarization plate has an influence on the polarization state of the incident light, thereby highly influencing the white and black display states of the liquid crystal display device. Therefore, when the adhesion direction of the polarization plate becomes non-uniform in a process of manufacturing the liquid crystal display device and in a process of manufacturing the polarization plate, it is regarded as a non-uniformity of the display state. Particularly, when the black display state becomes non-uniform, a large non-uniformity is caused in a contrast value or a viewing angle characteristic calculated on the basis of the contrast value. One of the non-uniformity causes of the adhesion direction of the polarization plate is a precision problem in a manufacturing process of a polarization plate maker. That is, the non-uniformity in an angle caused when starting to cur a polarization plate into a desired size is one cause. Therefore, a method of measuring transmission axis directions of polarization plates manufactured in a polarization plate maker after purchasing the same, correcting a deviation of the transmission axis direction one plate-by-one plate and then adhering the polarization plates has been proposed (for example, refer to JP-A-2003-107452).

SUMMARY

However, since all the transmission axes of the polarization plates are measured and the adhesion angle is adjusted one plate-by-one plate depending on the measurement result, much time and effort are required, which increases the cost. Also, the non-uniformity in the adhesion process, which is one cause of the deviation of the transmission axis of the polarization plate, cannot be reduced by the above method.

This disclosure makes an initial orientation direction of a liquid crystal material deviate in an opposite response direction, which is an opposite direction to a response direction of the liquid crystal material by an applied voltage. Thereby, even though a slight light leakage is seen at an initial orientation state of the liquid crystal material where no voltage is applied, the transmittance is very small at a state where a voltage is applied, so that a favorable display having a high contrast can be obtained even when a non-uniformity occurs as regards the adhesion of a polarization plate and a transmission axis in a manufacturing process.

A liquid crystal display device of a horizontal electric field type of this disclosures includes: a first transparent substrate and a second transparent substrate, which are arranged to face each other; a liquid crystal material sandwiched between the first transparent substrate and the second transparent substrate; a first electrode and a second electrode formed on a liquid-crystal-side surface of the first transparent substrate; and two polarization plates respectively adhered to opposite-side surfaces, which are opposite to the liquid crystal material, of the first transparent substrate and the second transparent substrate such that respective transmission axes thereof are orthogonal to each other. The liquid crystal material is rotated and is thus enabled to respond by an electric field generated between the first electrode and the second electrode. With respect to the transmission axis, which is one of the transmission axes of the two polarization plates and is located in an extending direction between the first electrode and the second electrode, an initial orientation direction of the liquid crystal material is within a range between a direction rotated by 0.5-degree in an opposite response direction of the liquid crystal material and a direction orthogonal to an electric field direction generated between the first electrode and the second electrode.

According to the liquid crystal display device, the initial orientation direction of the liquid crystal material is deviated in the opposite response direction with respect to the transmission axis in the electrode extension direction of the transmission axes of the two polarization plates. Thereby, it is possible to obtain a favorable display having a high contrast.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Figure 1:
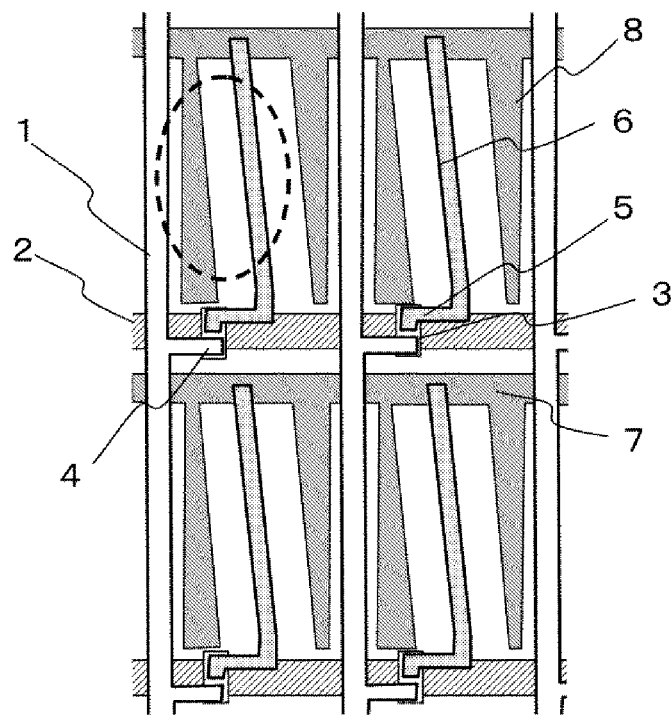
FIG. 1 is a pixel plan view of a liquid crystal display device of a horizontal electric field type.

In the descriptions and drawings of illustrative embodiments, the parts denoted with the same reference numerals indicate the same or equivalent parts.

First Illustrative Embodiment

<Pixel Structure>

In a liquid crystal display device of a horizontal electric field type, a pixel structure is formed on one transparent substrate, and a color filter and a black matrix are formed on the other opposed transparent substrate. Orientation films for which orientation processing has been performed are formed on the surfaces of each of the two transparent substrates. A liquid crystal material is oriented in an orientation processing direction and is sandwiched between the transparent substrates. An orientation of the liquid crystal material 9 at a state where a voltage is not applied is referred to as an initial orientation, and an orientation direction thereof is referred to as an initial orientation direction.

FIG. 1 is a pixel plan view of a liquid crystal display device of a horizontal electric field type. Specifically, FIG. 1 is a pixel plan view of a liquid crystal display device of an in-plane switching mode. A pixel structure formed on the transparent substrate is described with reference to FIG. 1.

FIG. 1 is an enlarged plan view of pixel regions formed on one transparent substrate of the liquid crystal display device, in which four pixel regions of the pixel regions are shown with being enlarged. In a vertical direction of FIG. 1, a signal wiring 1 for supplying a voltage to be applied to a pixel is formed. In a direction orthogonal thereto, a scanning wiring 2 for supplying a signal to select a pixel to which the voltage is to be applied is formed. A region surrounded by the signal wiring 1 and the scanning wiring 2 configures respective pixel regions.

A thin film transistor 3 is formed in the vicinity of an intersection part of the signal wiring 1 and the scanning wiring 2, and a source electrode 4 connected to the signal wiring 1 and a drain electrode 5 connected to a pixel electrode 6 are formed thereon with interposing an insulation film therebetween. When the thin film transistor 3 is in off state, a voltage is not applied to the pixel electrode 6, and when the thin film transistor 3 is in on state, a voltage applied from the signal wiring 1 is applied to the pixel electrode 6 through the source electrode 4, the thin film transistor 3 and the drain electrode 5. The pixel electrode 6 faces a U-shaped common electrode 8 connected to a common wiring 7, thereby configuring a pair of comb-shaped electrodes alternately arranged. The liquid crystal material 9 (which is not shown in FIG. 1) is enabled to respond by an electric field generated between the pixel electrode 6 and the common electrode 8, thereby making a display.

Figure 2:
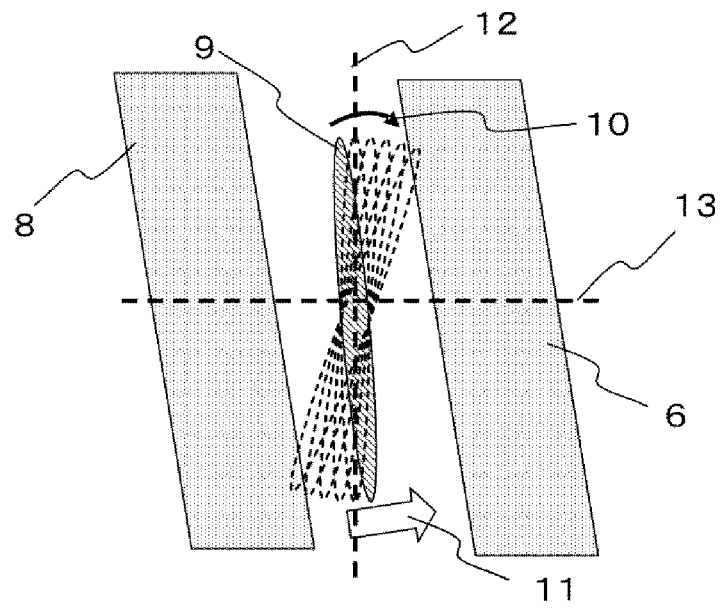
FIG. 2 is a schematic view illustrating a response of a liquid crystal material in a pixel.

FIG. 2 is an enlarged view of a part shown with the dashed line in FIG. 1. FIG. 2 is a schematic view illustrating a response of the liquid crystal material 9 in the pixel, in which a responding part of the liquid crystal material 9 by the electric field generated between the pixel electrode 6 and the common electrode 8 is shown with being enlarged. In FIG.

2, the thin film transistor 3, the various wirings, the opposed color filter substrate and the like are not shown. In FIG. 2, a dashed line 12 in the vertical direction indicates a transmission axis of a polarization plate adhered to a front side of the liquid crystal display device, and a dashed line 13 in a horizontal direction indicates a transmission axis of a polarization plate adhered to a back side thereof.

A thick white arrow indicates an electric field direction 11 applied between the pixel electrode 6 and the common electrode 8, and the electric field is applied in a direction orthogonal to the extending direction of the pixel electrode 6 and the common electrode 8. A thin arrow indicates a response direction 10 of the liquid crystal material 9 by the electric field. Meanwhile, in this illustrative embodiment, the extending direction of the pair of comb-shaped electrodes alternately arranged (the pixel electrode 6 and the common electrode 8) is 100-degree (the right direction is defined as 0-degree). Therefore, the electric field direction 11 shown with the thick arrow between the comb-shaped electrodes is a 10-degree-direction orthogonal to the extending direction of the comb-shaped electrodes 6, 8. In FIG. 2, fine dashed lines having the shape of the liquid crystal material 9 schematically illustrate a changing aspect of the liquid crystal direction by the applied voltage.

In this illustrative embodiment, as shown in FIG. 2, the transmission axis directions 12, 13 of the polarization plates are arranged to be orthogonal to each other. Specifically, the transmission axis 12 of the polarization plate on the surface is set to be 90-degree (when the right side is defined as 0-degree) and the transmission axis 13 of the polarization plate on the back side is set to be 0-degree. The initial orientation direction, which is the orientation direction of the liquid crystal material 9 when the voltage is not applied, is set to be 90.5-degree. That is, the initial orientation direction of the liquid crystal material 9 is a direction to which the liquid crystal material 9 is rotated in an opposite direction (an opposite response direction) to a direction, in which the liquid crystal material 9 is enabled to respond by the electric field generated between the comb-shaped electrodes 6, 8, by 0.5-degree beyond the transmission axis 12 of the polarization plate closer to the extending direction (80-degree) of the comb-shaped electrodes 6, 8. As shown with the thick arrow, the electric field direction 11 is orthogonal to the respective electrodes, and the liquid crystal material 9 is enabled to respond in the thin arrow direction 10 by the applied voltage.

<Optical Characteristics>

Figure 3:
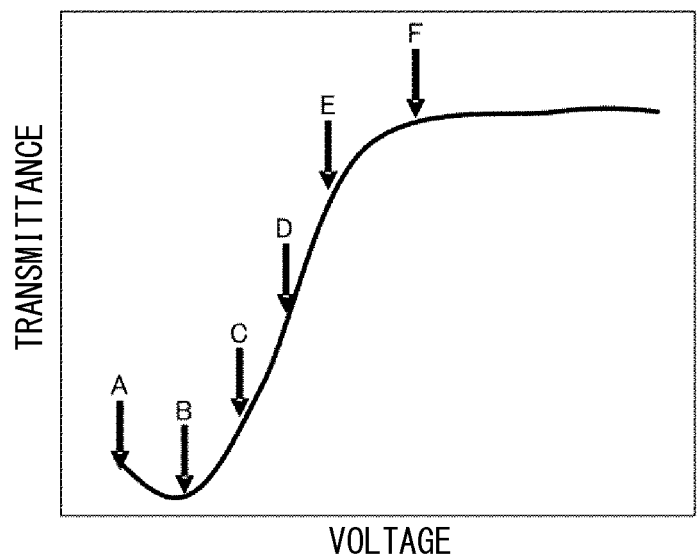
FIG. 3 is a graph showing a voltage-transmittance characteristic of the liquid crystal display device.

An example of a voltage-transmittance characteristic of the liquid crystal display device having the above pixel structure is shown in FIG. 3. FIG. 3 shows a feature of the voltage-transmittance characteristic of the liquid crystal display device having the above pixel structure in a simplified shape and does not shows actual values of the transmittance and voltages.

In a typical liquid crystal display device of a horizontal electric field type, the polarization plates are adhered to the front side and the back side with the transmission axes being orthogonal to each other, and the initial orientation direction of the liquid crystal material at a state where no voltage is applied is made to coincide with the transmission axis direction of the polarization plate on the front side or back side. When the liquid crystal material 9 is oriented in this way, it is possible to lower a black level at the initial orientation state (a black display state), thereby obtaining a favorable display. That is, when the transmission axis direction of the polarization plate on the front side or back side is made to coincide with the initial orientation direction, the light penetrating the polarization plate and incident into the liquid crystal material 9 reaches the opposite polarization plate, as it is, while the liquid crystal material 9 does not change the polarization state of the light. Since the two polarization plates are adhered with the transmission axes being orthogonal to each other, the light cannot penetrate the opposite polarization plate, so that it is possible to obtain a favorable display.

However, in this illustrative embodiment, since the initial orientation direction of the liquid crystal material 9 is oriented to deviate from the transmission axis direction of the polarization plate by 0.5-degree, a light leakage occurs at the initial orientation state, and the transmittance is slightly increased at a state where no voltage is applied (A in FIG. 3). Then, when a voltage is applied and the direction of the liquid crystal material 9 is thus gradually changed, the transmission axis direction of the polarization plate coincides with the orientation direction of the liquid crystal material 9 and the liquid crystal material 9 does not influence the polarization state of the incident light. As a result, the transmittance is lowered (B in FIG. 3).

When the applied voltage is increased and the liquid crystal material 9 is thus further rotated, the transmittance is gradually increased towards C to F in FIG. 3 and finally becomes a substantially constant value. When displaying an image, the applied voltage is set at each graduation and is used for a display, based on the voltage-transmittance characteristic. However, in the case of the liquid crystal display device of this illustrative embodiment, the initial orientation state (A in FIG. 3) where no voltage is applied is not used for a black display but the state B in FIG. 3 where the voltage is applied is used for a gradation for a black display. Thereby, even when a liquid crystal orientation deviation occurs, it is possible to obtain a favorable display.

<About Transmission Axis Direction of Polarization Plate and Deviation of Initial Orientation Direction of Liquid Crystal Material>

The polarization plates are adhered on the front side and back side of the liquid crystal display device so that the transmission axes thereof are orthogonal to each other. When the direction of the transmission axis of the one polarization plate coincides with the initial orientation direction of the liquid crystal material 9, it is possible to obtain the most favorable display characteristic. However, the direction of the transmission axis of the polarization plate deviates in a manufacturing process thereof, in an adhesion process to the liquid crystal display device and the like, and the deviation generally occurs in a range of about ±0.5-degree. For this reason, it is difficult to make the transmission axes of the polarization plate on the front side and back side orthogonal to each other and to completely conform the initial orientation of the liquid crystal material 9 to any one of the transmission axes in all the liquid crystal display devices.

In this illustrative embodiment, the liquid crystal material is oriented to deviate from the transmission axis of the polarization plate in a counterclockwise direction (in the opposite response direction to the response direction of the liquid crystal material by the applied voltage) by 0.5-degree. As described above, the transmission axis direction of the polarization plate is changed by about ±0.5-degree in the manufacturing process of the liquid crystal display device. Therefore, when the initial orientation direction of the liquid crystal material 9 is oriented to deviate by 0.5-degree in the opposite response direction, the initial orientation direction of the liquid crystal material 9 always deviates in the opposite response direction with respect to the transmission axis direction of the polarization plate, even though the transmission axis direction of the polarization plate deviates in the adhesion process of the polarization plate.

In the meantime, as described above, if the manufacturing process is performed so that the transmission axis directions of the polarization plates are orthogonal to each other and the transmission axis direction of the polarization plate completely coincides with the initial orientation direction of the liquid crystal material 9, it is not possible to control the direction (the response direction or opposite response direction) towards which the orientation of the liquid crystal material 9 deviates in the actually manufactured liquid crystal display device. As a result, both a liquid crystal display device in which the liquid crystal material deviates in the response direction by the applied voltage and a liquid crystal display device in which the liquid crystal material deviates in the opposite response direction are manufactured.

In the above descriptions of the optical characteristics, when the liquid crystal material is oriented to deviate by 0.5-degree in the opposite response direction, like this illustrative embodiment, it is possible to minimize the transmittance during the response of the liquid crystal material 9 due to the applied voltage, i.e., at a state where the orientation direction is rotated by 0.5-degree in the response direction. Therefore, it is possible to obtain a favorable display by adjusting a voltage for a black display. However, when the liquid crystal material 9 is oriented to deviate in the clockwise direction by 0.5-degree, the light leakage occurs at the initial orientation state. Also, the light leakage is increased by the voltage and can be improved by the voltage adjustment.

When the manufacturing process is performed with the aim of completely conforming the transmission axis direction of the polarization plate to the initial orientation direction of the liquid crystal material 9, the liquid crystal display device deviating in any direction may be manufactured. Therefore, the display characteristic of an about half of the liquid crystal display devices cannot be improved by the voltage adjustment. However, when the liquid crystal orientation direction is oriented to intentionally deviate in the opposite direction to the response due to the applied voltage, like this illustrative embodiment, it is possible to stably secure the liquid crystal display device having a favorable display characteristic by using a state where a slight voltage is applied for the black display.

In the liquid crystal display device of a horizontal electric field type of the background art, a state where no voltage is applied is used for the black display. For this reason, when the display state is switched from the white display state to the black display state, a voltage is switched from a voltage for the white display to a voltage for the black display, i.e., to the state where no voltage is applied. Considering the orientation state of the liquid crystal material, since a voltage is applied during the white display, the liquid crystal material is rotated in a direction of the electric field. In order to switch the white display to the black display, the voltage being applied should be cut off. That is, in order to return the liquid crystal material to the initial orientation direction, it is not possible to forcibly return the liquid crystal orientation to the initial orientation and it takes long time for the liquid crystal orientation state to naturally return to the original state, so that a response speed thereof is slow.

However, according to the pixel configuration described in this illustrative embodiment, the state where the voltage is applied is used for the black display. Therefore, in a case of switching the display from the white display to the black display, if the voltage is switched from the voltage for the white display to the state where no voltage is applied, not to the voltage for the desired black display, it is possible to further emphasize the voltage change. Also, the liquid crystal material 9 can return from the rotated response state for the white display to the slightly rotated state (where a voltage is slightly applied, not 0V) for the black display at high speed, so that it is possible to increase the response speed.

Figure 8:
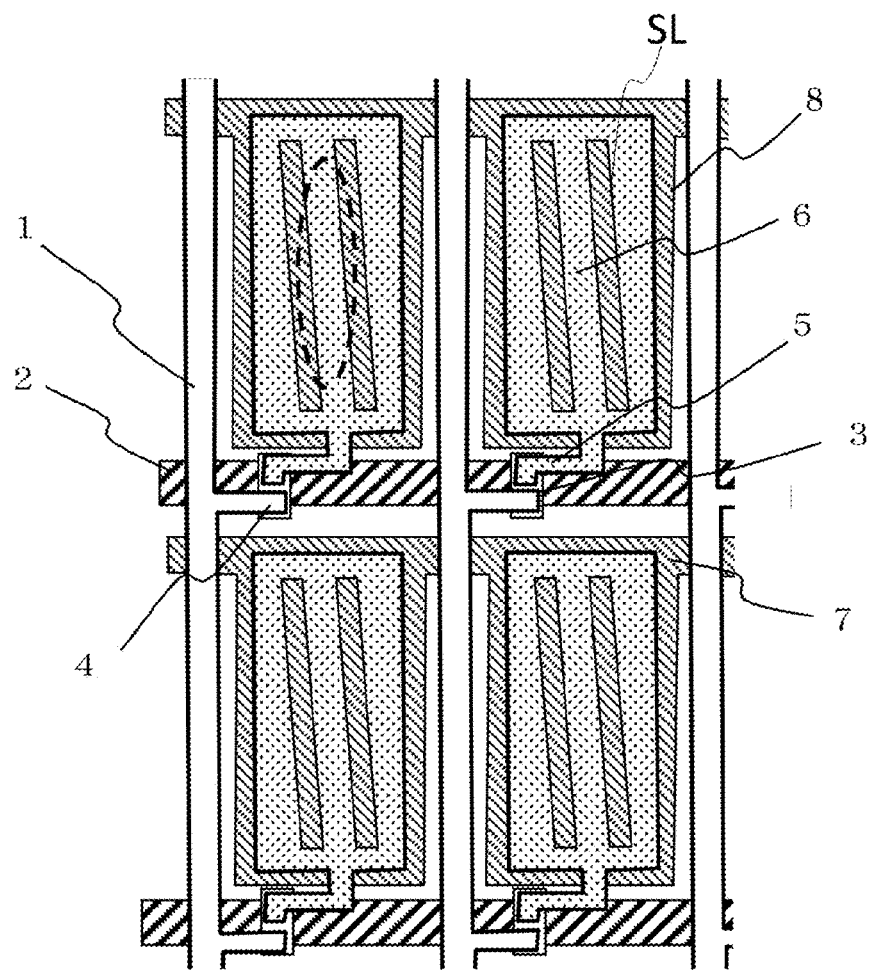
FIG. 8 is a schematic view illustrating a pixel configuration of an alternative embodiment of the invention.
Figure 9:
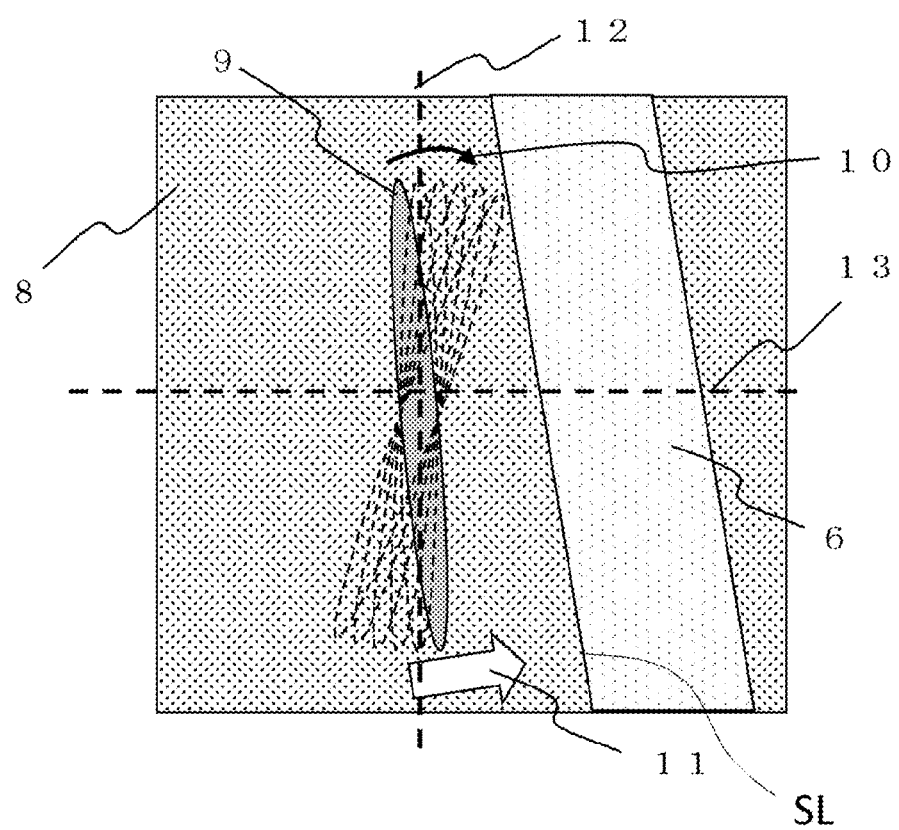
FIG. 9 is an enlarged view of the area indicated by the broken line in FIG. 8.

Meanwhile, in this illustrative embodiment, as described above, the liquid crystal display device of an in-plane switching mode has exemplified as the liquid crystal display device of a horizontal electric field type. However, as shown in FIG. 8 and FIG. 9, that is an enlarged view of the are indicated by the broken line FIG. 8, this disclosure can be also applied to a liquid crystal display device of a fringe field switching mode which is another liquid crystal display device of a horizontal electric field type and in which a slit is formed on an upper layer electrode (pixel electrode 6) on one transparent substrate and a planar electrode is used as a lower layer electrode (common electrode 8).

Second Illustrative Embodiment

Figure 4:
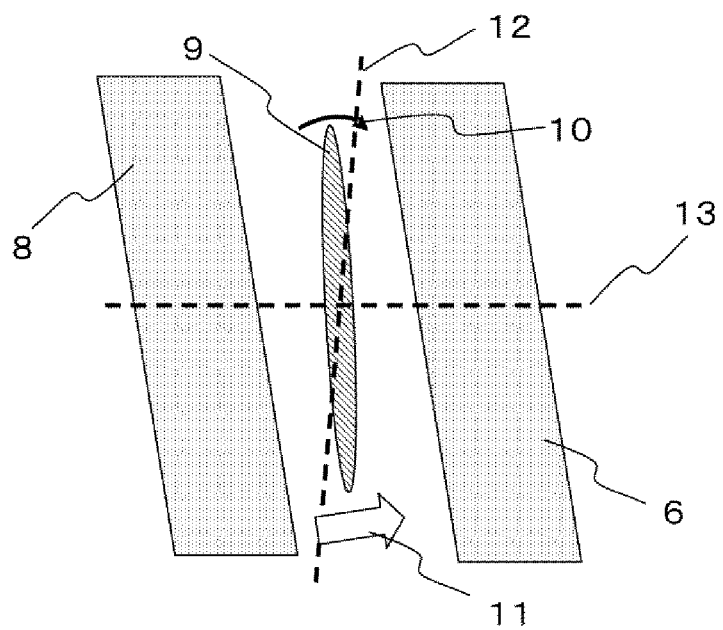
FIG. 4 is a schematic view illustrating a pixel configuration.

FIG. 4 is a schematic view showing a pixel configuration according to a second illustrative embodiment. Similarly to FIG. 2, FIG. 4 is an enlarged schematic view of the part surrounded by the dashed line of FIG. 1. The extending direction of the comb-shaped electrodes 6, 8 of the pixel is 100-degree and the electric field direction 11 shown with the thick white arrow is a 10-degree-direction orthogonal to the extending direction of the comb-shaped electrodes 6, 8. Also, the transmission axis 12 of the polarization plate on the front side is 89.5-degree, the transmission axis 13 of the polarization plate on the back side is 0-degree and the initial orientation direction, which is the liquid crystal orientation direction at the state where no voltage is applied, is 90.5-degree. That is, the adhesion angles of the transmission axes of the polarization plates deviate in a range of ±0.5-degree, the polarization plate on the front side is adhered with the precision of −0.5-degree and the polarization plate on the back side is adhered with the precision of ±0-degree. The initial orientation direction of the liquid crystal material is set to deviate by 0.5-degree in the opposite response direction to the response direction 10 (the small arrow) in which the liquid crystal material is enabled to respond by the electric field. At this state, the slight light leakage is observed while a voltage is not applied.

When a voltage is applied, the orientation of the liquid crystal material 9 is gradually rotated in the clockwise direction (the small arrow direction 10) and thus the light leakage, which is observed at the state where no voltage is applied, is gradually reduced. In this pixel configuration, the transmittance is lowest when the liquid crystal orientation becomes about 89.75-degree. Therefore, when the state where the liquid crystal orientation direction becomes 89.75-degree as the voltage is applied is set for a gradation for the black display, it is possible to obtain a favorable display having a high contrast.

Third Illustrative Embodiment

Figure 5:
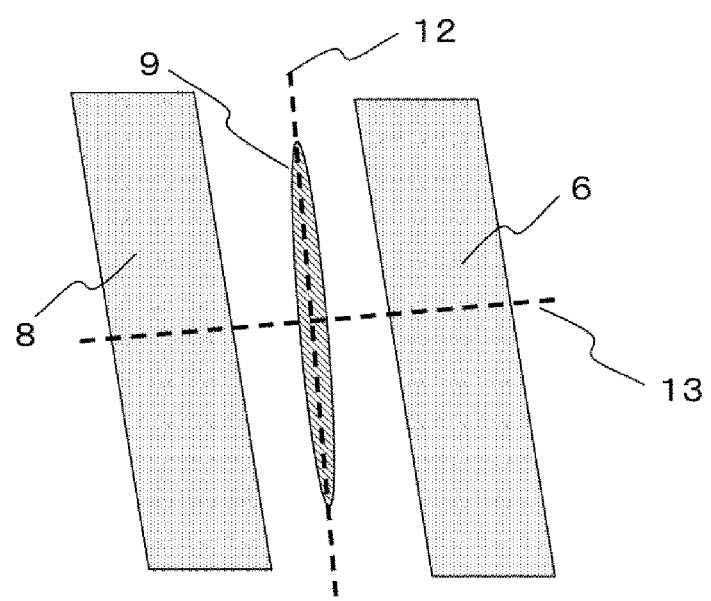
FIG. 5 is a schematic view illustrating a pixel configuration.

FIG. 5 is a schematic view showing a pixel configuration according to a third illustrative embodiment. Similarly to FIG. 2, FIG. 5 is an enlarged schematic view of the part surrounded by the dashed line of FIG. 1. The extending direction of the comb-shaped electrodes 6, 8 of the pixel is 100-degree and the electric field direction 11 is a 10-degree-direction orthogonal to the extending direction of the comb-shaped electrodes 6, 8. Also, the transmission axis 12 of the polarization plate on the surface is 90.5-degree, the transmission axis 13 of the polarization plate on the back side is 0.5-degree and the initial orientation direction, which is the liquid crystal orientation direction at the state where no voltage is applied, is 91-degree. That is, the adhesion precisions of the transmission axes of the polarization plates are ±0.5-degree. In this illustrative embodiment, any polarization plate deviates by 0.5-degree in the counterclockwise direction.

The initial orientation direction of the liquid crystal material 9 is set to further deviate by 0.5-degree from the transmission axis direction of the polarization plate in the opposite response direction of the liquid crystal material 9 when an electric field is applied. At this state, the slight light leakage is observed while a voltage is not applied. When a voltage is applied, the orientation of the liquid crystal material 9 is gradually rotated in the clockwise direction. In this pixel configuration, the transmittance is smallest when the orientation direction of the liquid crystal material 9 becomes 90.5-degree by the applied voltage. When the voltage is further applied, the light leakage is gradually increased and the transmittance is increased.

In this illustrative embodiment, when the state where the liquid crystal orientation direction becomes 90.5-degree as the voltage is applied is used for a gradation for the black display, it is possible to obtain a favorable display having a high contrast.

Fourth Illustrative Embodiment

Figure 6:
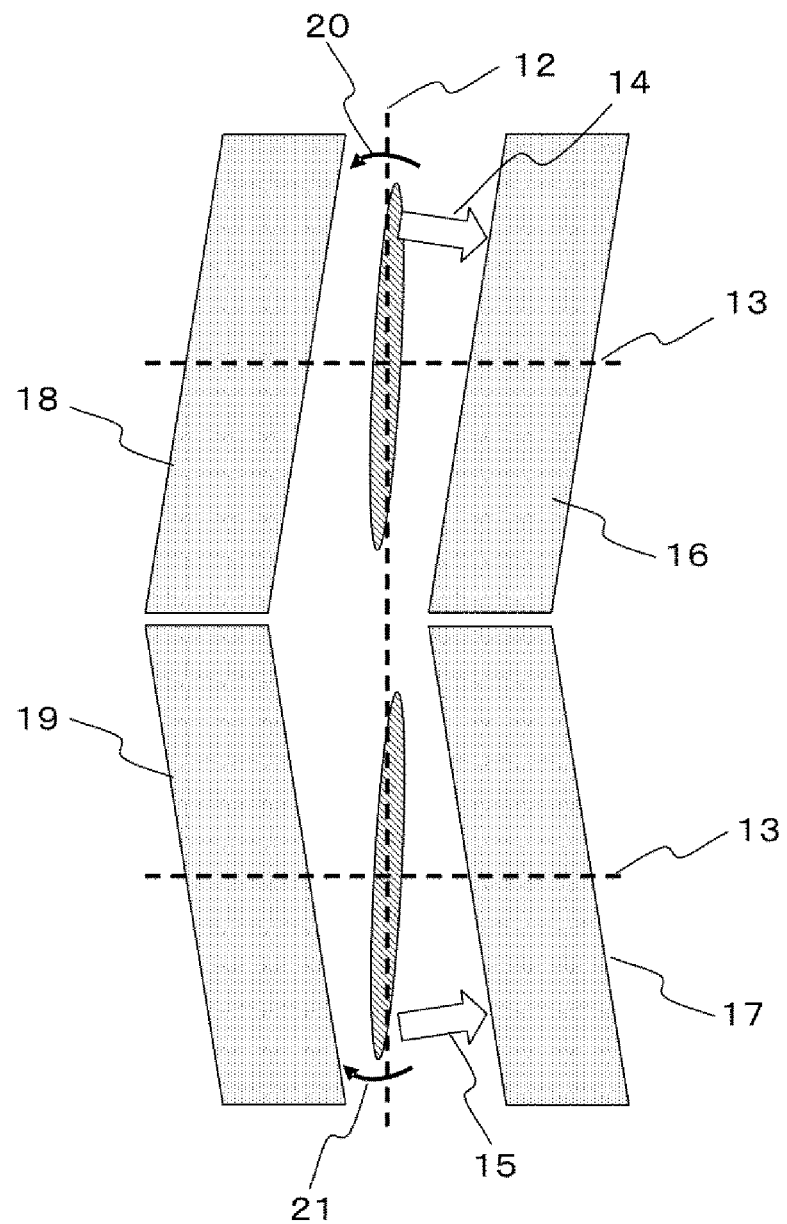
FIG. 6 is a schematic view illustrating a pixel configuration of the liquid crystal display device of a horizontal electric field type having L-shaped electrodes.

FIG. 6 is a schematic view illustrating a pixel configuration of the liquid crystal display device of an in-plane switching mode, which is a liquid crystal display device of a horizontal electric field type and in which a pair of comb-shaped electrodes is respectively arranged in an L shape. Similarly to FIG. 2 and the like, FIG. 6 is an enlarged schematic view of the part surrounded by the dashed line of FIG. 1.

Pixel electrodes 16, 17 and common electrodes 18, 19 used in this illustrative embodiment form an L shape, respectively. The respective pixel electrodes 16, 17 and common electrodes 18, 19 are electrically separated at upper and lower parts of the pixel. For this reason, the electric field is applied in a thick white arrow direction 14 at the upper part of the pixel and is applied in a thick white arrow direction 15 at the lower part of the pixel. Magnitudes of the respective electric fields can be separately set at the upper and lower parts of the pixel. Therefore, when the voltage is applied, the liquid crystal material 9 at the upper part of the pixel responds in the counterclockwise direction and the liquid crystal material 9 at the lower part of the pixel responds in the clockwise direction, as shown with the small arrows indicating the response directions 20, 21 of the liquid crystal material 9, and the respective response states can be separately set.

In the liquid crystal display device of a horizontal electric field type shown in FIG. 6, the liquid crystal molecules respond in parallel with the substrate surface by the horizontal electric field type, the comb-shaped electrodes (the pixel electrodes 16, 17 and the common electrodes 18, 19) form an L shape and the response directions are different at the upper and lower parts of the pixel. Therefore, influences of the liquid crystal material 9 depending on an observing direction are averaged, so that the viewing angle characteristic becomes wider than the liquid crystal display device in which the comb-shaped electrodes 6, 8 do not form an L shape (refer to FIG. 2 and the like).

In FIG. 6, the transmission axis direction of the polarization plate on the front-side is 90-degree and the transmission axis direction of the polarization plate on the back side is 0-degree. Also, the extending direction of the comb-shaped electrodes such as the pixel electrodes is 80-degree at the upper part of the pixel and 100-degree at the lower part of the pixel. At this time, the initial orientation direction of the liquid crystal material is 89.5-degree. The response direction of the liquid crystal material 9 by the applied voltage is the counterclockwise direction (a small arrow direction 20 indicating the response direction of the liquid crystal material) at the upper part of the pixel and is the clockwise direction (a small arrow direction 21 indicating the response direction of the liquid crystal material) at the lower part of the pixel.

At the upper part of the pixel, the transmission axis direction of the polarization plate on the surface is 90-degree and the initial orientation direction, which is the orientation direction of the liquid crystal molecule when no voltage is applied, is 89.5-degree. When the voltage is applied, the liquid crystal material responds in the counterclockwise direction. Therefore, the liquid crystal material is oriented to deviate in the opposite response direction at the initial orientation state. When the voltage is applied, the liquid crystal material responds in the counterclockwise direction (the small arrow direction 20), so that the liquid crystal material 9 responds via a direction coinciding with the transmission axis direction of the polarization plate. That is, considering the relation between the transmittance and the voltage, when the voltage is applied, the transmittance is once lowered and is then gradually increased.

On the other hand, at the lower part of the pixel, the transmission axis direction of the polarization plate on the surface is 90-degree and the initial orientation direction of the liquid crystal material 9 is 89.5-degree. When the voltage is applied, the liquid crystal material responds in the clockwise direction. Therefore, the liquid crystal material is oriented to deviate in the initial orientation response direction. For this reason, when the voltage is applied, the liquid crystal material responds in the clockwise direction, so that the liquid crystal material 9 responds in a direction getting away from the transmission axis direction of the polarization plate without coinciding with the transmission axis direction of the polarization plate. That is, considering the relation between the transmittance and the voltage, the slight light leakage is observed at the state where no voltage is applied, and when the voltage is applied, the transmittance is gradually increased without being once lowered.

Considering the relation between the voltage and the transmittance at the upper and lower parts of the pixel, when the voltage is applied, while the transmittance is once lowered and is then gradually increased at the upper part of the pixel, the transmittance is simply increased at the lower part of the pixel as the voltage is applied. Therefore, seeing the transmittances at the same time, while the transmittance is lowered and a favorable black display is made at one side, the light leakage is observed at the other side. Thus, the transmittance of the black display is increased, so that the favorable display characteristic cannot be obtained.¥

Therefore, when the L-shaped electrodes are used in a liquid crystal panel, like this illustrative embodiment, it is necessary to change the orientation directions at the upper and lower parts of the pixel. In this illustrative embodiment, the liquid crystal material is oriented in the direction of 89.5-degree at the upper part of the pixel and in the direction of 90.5-degree at the lower part of the pixel (refer to FIG. 7). When the liquid crystal material is oriented at this condition, the liquid crystal material can be initially oriented so that they deviate in the opposite response direction at both the upper and lower parts of the pixel.

As a method of changing the orientation direction of the liquid crystal molecule in the pixel, a mask rubbing method of masking one side with a resist and rubbing the other side, an ion beam method of illuminating an ion beam to an orientation film surface and the like can be used.

Figure 7:
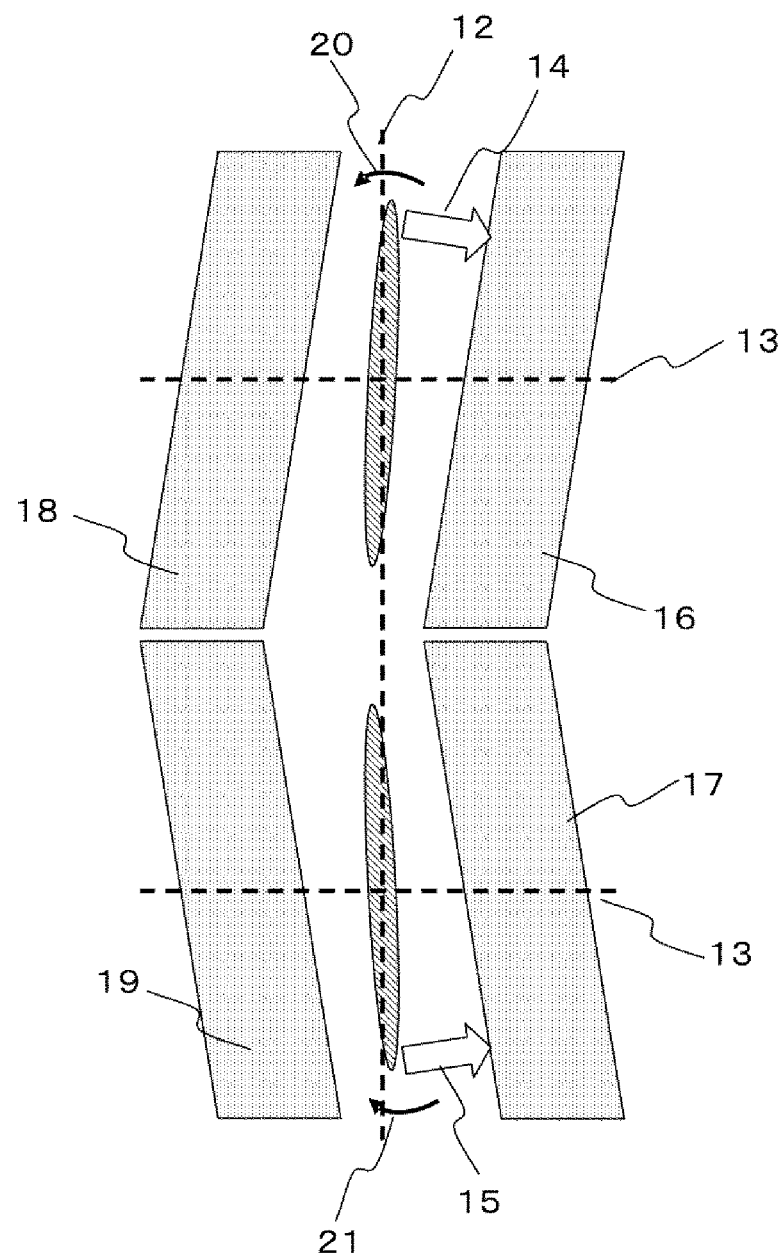
FIG. 7 is a schematic view illustrating a pixel configuration.

FIG. 7 is a schematic view of a pixel configuration. In the pixel structure shown in FIG. 7, the liquid crystal material 9 responds in the opposite direction at the upper and lower parts of the pixel, and both the upper and lower parts make a black display when the voltage is slightly applied. Therefore, it is possible to make a display of a favorable characteristic. In FIG. 7, the initial orientation directions of the liquid crystal materials at the upper and lower parts of the pixel are symmetric with respect to the direction of the transmission axis 12 of the polarization plate on the surface. Therefore, it is possible to obtain a favorable display when the same voltage is applied at the upper and lower parts of the pixel.

However, it is also considered that when the initial orientation directions of the liquid crystal materials 9 at the upper and lower parts of the pixel are not symmetric, the voltages for obtaining the most favorable black display are different at the upper and lower parts. Therefore, it is possible to precisely adjust the response state of the liquid crystal material 9 due to the applied voltage by electrically separating the upper and lower parts of the comb-shaped electrodes (the pixel electrodes 16, 17 and the common electrodes 18, 19) and applying the separate voltages thereto. Since the pixel structure of this illustrative embodiment adopts the horizontal electric field type using the L-shaped electrodes, it is possible to obtain a very wide viewing angle characteristic and to make a liquid crystal display having the favorable contrast and viewing angle.

Figure 10:
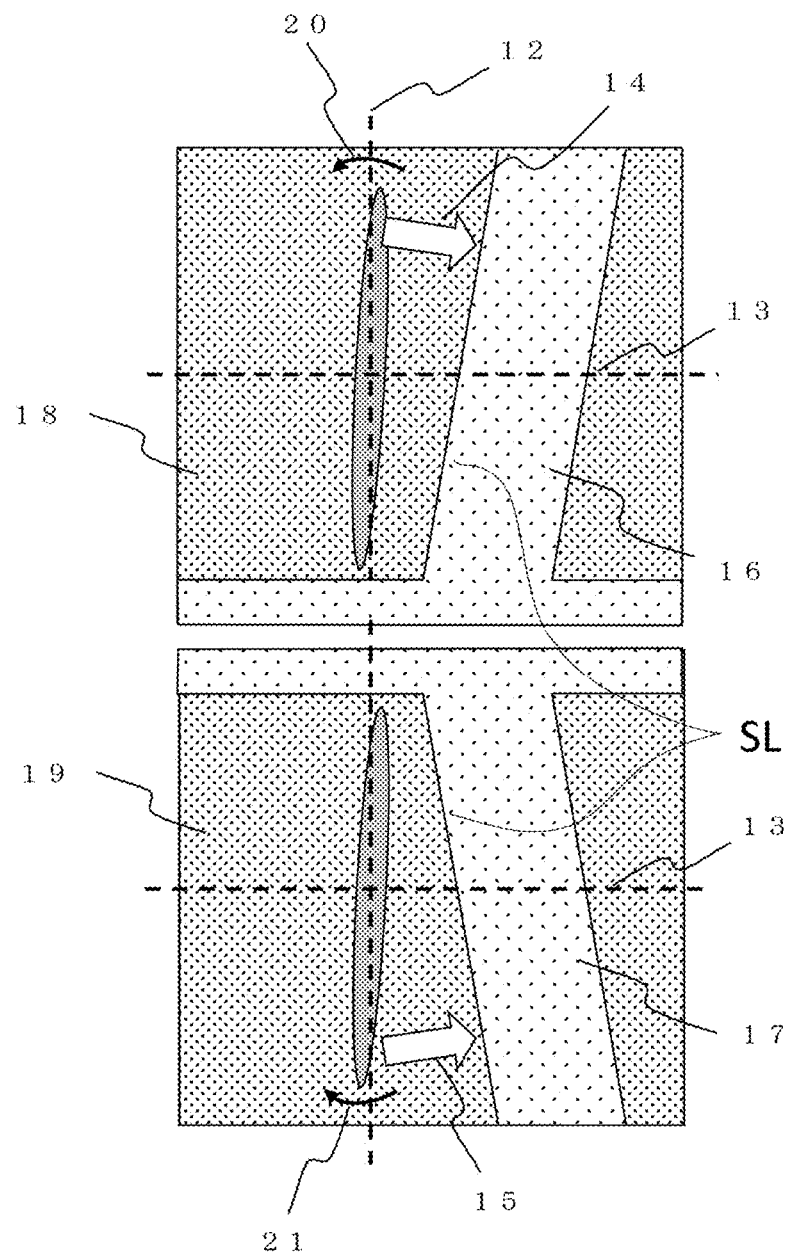
FIG. 10 is a schematic view illustrating a pixel configuration of a further alternative embodiment of the invention.

Also, in this illustrative embodiment, the liquid crystal display device of an in-plane switching mode using the comb-shaped electrodes (the pixel electrodes 16, 17 and the common electrodes 18, 19) has been exemplified. However, as shown in FIG. 10, it is also possible to apply this disclosure to a liquid crystal display device of a fringe field switching mode in which an L-shaped slit (SL) is formed on an upper layer electrode on one transparent substrate and a planar electrode (pixel electrode 16, 17) is used as a lower layer electrode (common electrode 18, 19), and to accomplish the same effects.

What is claimed is:

1. A liquid crystal display device of a horizontal electric field type comprising:
   a first transparent substrate and a second transparent substrate, which are arranged to face each other;
   a liquid crystal material sandwiched between the first transparent substrate and the second transparent substrate;
   a first electrode and a second electrode formed on a liquid-crystal-side surface of the first transparent substrate; and
   two polarization plates respectively adhered to opposite-side surfaces, which are opposite to the liquid crystal material, of the first transparent substrate and the second transparent substrate such that respective transmission axes thereof are orthogonal to each other, wherein the liquid crystal material is rotated and is thus enabled to respond by an electric field generated between the first electrode and the second electrode,
   with respect to the transmission axis, which is one of the transmission axes of the two polarization plates and is located in an extending direction between the first electrode and the second electrode, an initial orientation direction of the liquid crystal material is within a range between a direction rotated by 0.5-degree in an opposite response direction of the liquid crystal material and a direction orthogonal to an electric field direction generated between the first electrode and the second electrode,
   the electric field is generated in a plurality of directions between the first electrode and the second electrode in one pixel,
   the first electrode and the second electrode are respectively electrically separated in each region, in which a direction of the electric field generated between the first electrode and the second electrode is the same, and
   for each region, the magnitudes of the electric fields, at which the liquid crystal material responds and a transmittance of the liquid crystal material is minimized, are separately set, such that the magnitudes of the electrical fields for black display are different from the first region to the second region.

2. A liquid crystal display device of a horizontal electric field type comprising:
   a first transparent substrate and a second transparent substrate, which are arranged to face each other;
   a liquid crystal material sandwiched between the first transparent substrate and the second transparent substrate;
   a first electrode and a second electrode formed on a liquid-crystal-side surface of the first transparent substrate; and
   two polarization plates respectively adhered to opposite-side surfaces, which are opposite to the liquid crystal material, of the first transparent substrate and the second transparent substrate such that respective transmission axes thereof are orthogonal to each other, wherein the liquid crystal material is rotated and is thus enabled to respond by an electric field generated between the first electrode and the second electrode,
   with respect to the transmission axis, which is one of the transmission axes of the two polarization plates and is located in an extending direction between the first electrode and the second electrode, an initial orientation direction of the liquid crystal material is within a range between a direction rotated by 0.5-degree in an opposite response direction of the liquid crystal material and a direction orthogonal to an electric field direction generated between the first electrode and the second electrode,
   at least one of the first electrode and the second electrode has an electrode configured to generate the electric field in two or more directions and having a plurality of extending directions,
   the first electrode and the second electrode are electrically separated in each extending direction, and
   for each extending direction, the magnitudes of the electric fields, at which the liquid crystal material responds and a transmittance of the liquid crystal material is minimized, are separately set, such that the magnitudes of the electrical fields for black display are different from the first extending direction to the second extending region.

* * * * *